(No Model.)
J. L. SHARP.
BAKING OVEN.
No. 305,113.
Patented Sept. 16, 1884.
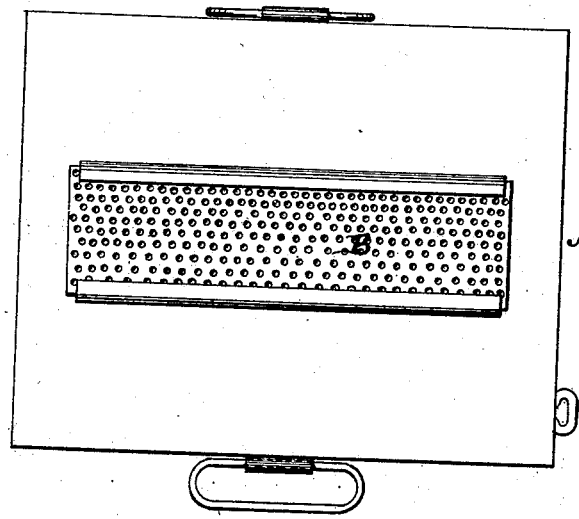
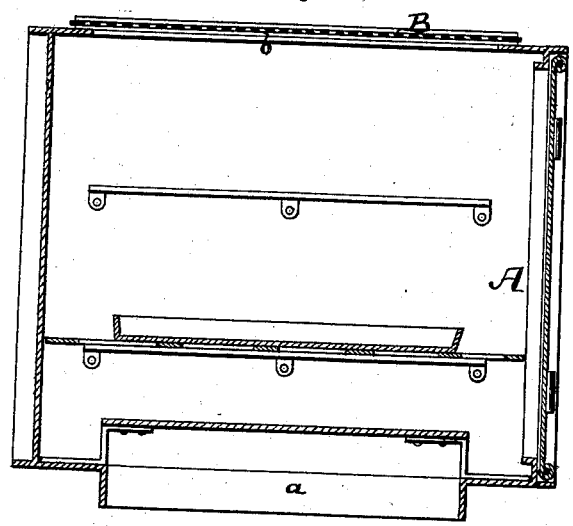
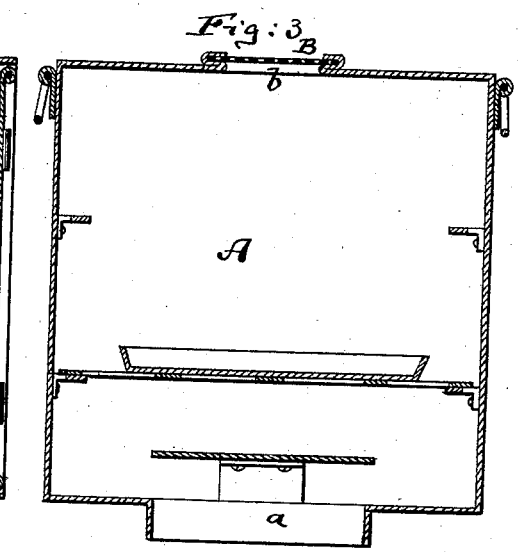
Witnesses:
John C. Tunbridge
Inventor:
James L. Sharp
by his attorneys
Briesen & Steele

UNITED STATES PATENT OFFICE.

JAMES L. SHARP, OF NEW YORK, N. Y.

BAKING-OVEN.

SPECIFICATION forming part of Letters Patent No. 305,113, dated September 16, 1884.

Application filed November 13, 1883. (No model.)

*To all whom it may concern:*

Be it known that I, JAMES L. SHARP, a resident of New York city, in the county and State of New York, have invented an Improved Baking-Oven, of which the following is a full, clear, and exact description, reference being made to the accompanying drawings, in which—

Figure 1 is a plan or top view of my improved baking-oven. Fig. 2 is a vertical longitudinal central section of the same, and Fig. 3 a vertical transverse central section of the same.

The object of this invention is to produce an oven which is more particularly intended for use as a portable oven on coal-oil stoves, gas-stoves, and the like, but which is applicable also for use in stoves of all kinds in which heated air is admitted to the bottom of the oven.

The invention consists, principally, in providing the top of the oven with a fine sieve or perforated screen, which sieve is aligned with the top of the oven, the bottom of the oven being open to the admission of heated air.

In the drawings, the letter A represents an oven of suitable size and form, made of sheet metal or other suitable material. The lower part of this oven has an opening, $a$, through which the heated air that is to be utilized in the oven is admitted to it. In the upper surface or upper part of the oven an aperture, $b$, is formed, which, however, is covered by a screen, B, which is perforated with numerous minute holes, and which screen is aligned with the top of said oven. This oven is to be placed on a gas-stove, coal-oil stove, or on any other contrivance for heating the air, the heated air entering the oven through the aperture $a$ at the bottom. It might seem plausible that this heated air will now escape from the oven through the apertures of the screen B, but experience has proved to me that such is not the fact. I have found by careful experiments that the screen B, having very minute holes, prevents the creation of draft in the oven, so that the heated air does not ascend in an upward direction and does not pass through it, but the cooler air, which is above the oven, because of its greater weight, will drop through the vertical apertures of the screen and enter the oven from above and will mingle in the oven with the heated air therein contained, crowding the surplus out at the lower aperture, $a$. When such an oven is placed over the flame of a gas or coal-oil stove, this downward discharge from the oven of the heated air, which has performed its duty in the oven, serves further to supply the flame with heated air, and to increase therefore its effectiveness. Practical experiments have satisfied me that an oven provided with this screen B, with its finely-perforated holes in the upper surface, bakes its contents faster and more thoroughly than any oven of other construction with which I am acquainted.

I do not claim forming large apertures in the tops or sides of ovens. Such have been heretofore employed, but had for their object to cause a draft of air from the bottom to the top of the oven. This is precisely what I wish to avoid. Nor do I claim an oven having perforations in its door or doors, because in such an oven, if anything, an injurious draft is created, which causes a great waste of fuel and retards the operation of cooking. Nor do I claim a dome with perforated sides in the top of an an oven, as such likewise will create a draft upward in the oven. I claim nothing that is shown in Patent No. 199,981.

I claim—

The oven A, having closed sides, the opening $a$ in its bottom, and the sieve-like screen B, aligned with the top surface of the oven, said sieve being provided with fine vertical perforations, the outer side of the said sieve being exposed to the cold air which surrounds the oven, all arranged to insure a downward current of air through said sieve, substantially as herein shown and described.

JAS. L. SHARP.

Witnesses:
H. B. BLAUVELT,
JAMES TURK.